United States Patent
Calabro

(10) Patent No.: US 6,915,627 B2
(45) Date of Patent: Jul. 12, 2005

(54) ROCKET ENGINE

(75) Inventor: Max Calabro, Villennes (FR)

(73) Assignees: Eads Space Transportation SA, Paris (FR); MBDA France, Paris (FR)

( * ) Notice: Subject to any disclaimer, the term of this patent is extended or adjusted under 35 U.S.C. 154(b) by 0 days.

(21) Appl. No.: 10/476,568

(22) PCT Filed: Feb. 27, 2003

(86) PCT No.: PCT/FR03/00630
§ 371 (c)(1),
(2), (4) Date: Nov. 4, 2003

(87) PCT Pub. No.: WO03/074859
PCT Pub. Date: Sep. 12, 2003

(65) Prior Publication Data
US 2004/0128980 A1 Jul. 8, 2004

(30) Foreign Application Priority Data
Mar. 4, 2002 (FR) .............................. 02 02686

(51) Int. Cl.⁷ ................................. F02K 9/64
(52) U.S. Cl. ........................................ 60/258; 60/251
(58) Field of Search ................ 60/257, 258, 260, 60/251

(56) References Cited
U.S. PATENT DOCUMENTS

| | | | |
|---|---|---|---|
| 3,069,847 A | 12/1962 | Vest, Jr. | |
| 3,151,446 A | 10/1964 | Parilla | |
| 3,307,359 A | 3/1967 | Cowell | |
| 4,703,620 A | 11/1987 | Niino et al. | |
| 4,840,025 A | 6/1989 | Coffinberry | |
| 5,363,645 A | 11/1994 | Pellet | |
| 5,438,834 A | 8/1995 | Vuillamy et al. | |
| 5,583,895 A | 12/1996 | Filipuzzi et al. | |
| 6,151,887 A | 11/2000 | Haidn et al. | |
| 6,182,442 B1 | 2/2001 | Schmidt et al. | |
| 6,202,405 B1 | 3/2001 | Beyer et al. | |
| 6,470,671 B1 | 10/2002 | Kretschmer | |
| 2002/0069636 A1 * | 6/2002 | Knuth et al. ................. | 60/205 |

FOREIGN PATENT DOCUMENTS

| | | |
|---|---|---|
| EP | 0401107 | 12/1990 |
| EP | 0571254 | 11/1993 |
| EP | 0604279 | 6/1994 |
| EP | 1013412 | 6/2000 |
| FR | 2610044 | 7/1988 |
| FR | 2773850 | 7/1999 |
| FR | 2774432 | 8/1999 |
| FR | 2791589 | 10/2000 |
| WO | 9904156 | 1/1999 |

* cited by examiner

Primary Examiner—Ehud Garenberg
(74) Attorney, Agent, or Firm—Stevens, Davis, Miller & Mosher LLP

(57) ABSTRACT

The invention concerns a rocket engine wherein the combustion chamber includes at least one first monolithic component made of a thermostructural composite material comprising a porous wall through which the fuel is introduced in the core of the combustion chamber. A small part of the fuel is directed towards the neck for it to be cooled.

12 Claims, 5 Drawing Sheets

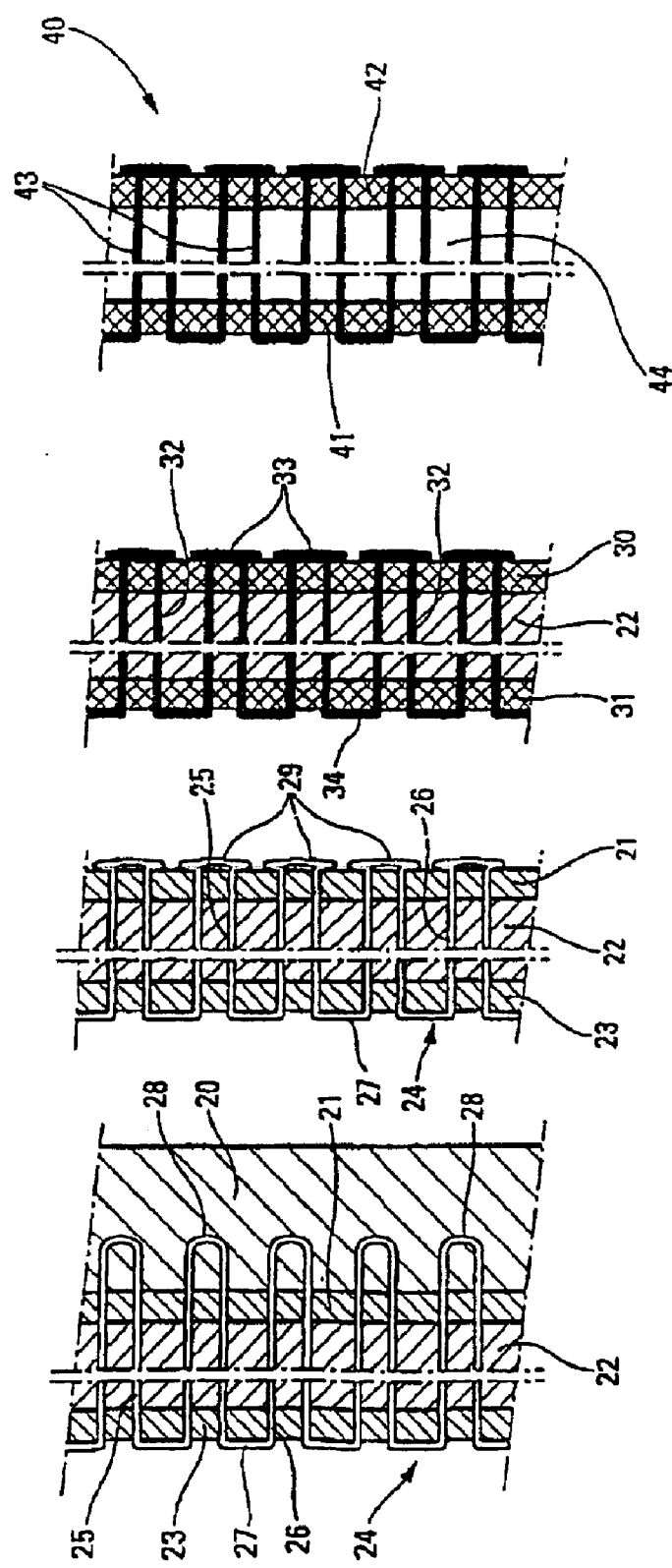

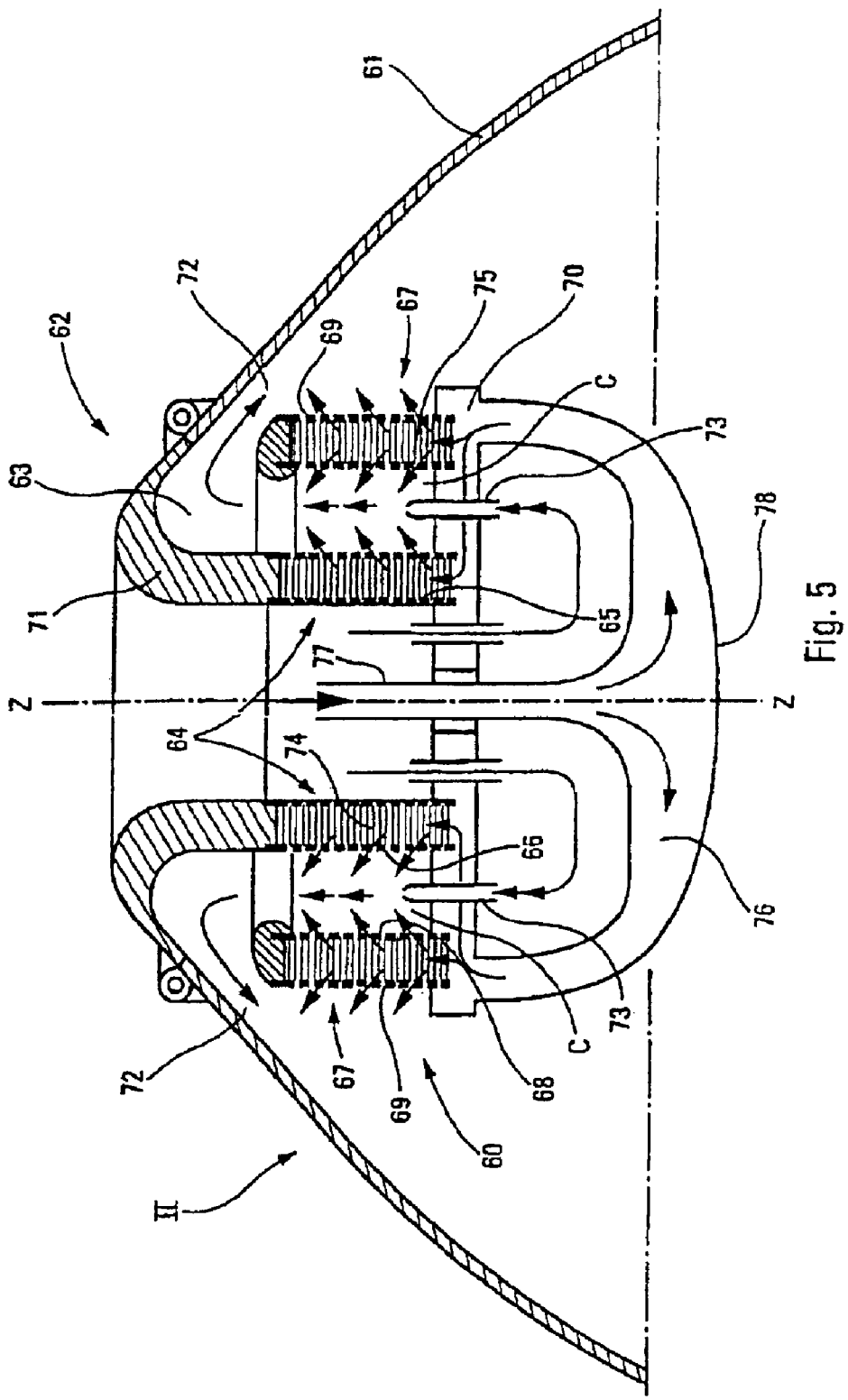

ROCKET ENGINE

FIELD OF THE INVENTION

The present invention relates to a rocket engine comprising a combustion chamber in which a fluid (liquid or gaseous) fuel, for example hydrogen, and a fluid (liquid or gaseous) oxidizer, for example oxygen, are burnt, said combustion chamber being connected to a divergent nozzle through which the gases resulting from the combustion escape.

BACKGROUND OF THE INVENTION

In known rocket engines of this type, because of the very high temperatures (of the order of 3300° C.) reached in said combustion chamber, the structure of the walls is particularly complex with networks of ducts for circulating a cooling fluid which, incidentally, may be said fuel itself. Examples of known walls are described, for example, in documents FR-A-2 773 850, FR-A-2 774 432, FR-A-2 791 589. In addition, the structure of said walls is not uniform but by contrast varies along the axis of the engine, according to the temperature at that point. Finally, particularly on account of the fact that the fuel is used as a cooling fluid and can circulate in the two opposite directions, these known engines require complex fuel supply manifolds.

SUMMARY OF THE INVENTION

It is an object of the present invention to overcome these disadvantages by allowing the production of a simple rocket engine, without a complex manifold, and having a very limited number of parts.

To this end, according to the invention, the rocket engine comprising a combustion chamber in the heart of which a fuel and an oxidizer are burnt and which is connected, by a throat, to a divergent nozzle through which the gases resulting from said combustion escape, said heart being supplied with oxidizer via its opposite end to said throat and being surrounded by a porous skin of thermostructural composite which receives fuel on its opposite outer side to said heart, some of this fuel being introduced into said heart through said porous skin, is notable in that said proportion of the fuel introduced into said heart through said porous skin constitutes the fuel supply to said engine and in that the proportion of said fuel not passing through said porous skin is directed toward said throat to cool it.

Thus, by virtue of the present invention, there is obtained a rocket engine that is simple, light in weight, can have just a few parts and can be produced with ease.

It will be noted that document WO-99/04156 describes a rocket engine comprising a combustion chamber in the heart of which a fuel and an oxidizer are burnt and which is connected, by a throat, to a divergent nozzle through which the gases resulting from said combustion escape, said heart being supplied with oxidizer via its opposite end to said throat and being surrounded by a porous skin of thermostructural composite which receives fuel on its opposite outer side to said heart, some of this fuel being introduced into said heart through said porous skin.

However, it must be pointed out that, in the rocket engine of document WO-99/04156, the proportion of fuel introduced into the heart through the porous skin is low and intended to cool the wall of said heart by seepage and that the proportion of fuel not passing through the porous skin is returned to fuel injectors. By contrast, in the rocket engine according to the present invention, the proportion of the fuel introduced into said heart through said porous skin is high and constitutes the fuel supply of said engine, whereas the proportion of said fuel not passing through said porous skin is directed toward said throat to cool it.

In addition, this earlier document anticipates the production of fuel circulation ducts in said porous skin, something that the present invention avoids through the novel structures proposed for the combustion chamber.

It will also be noted that, in the rocket engine of the invention, use is made of thermostructural composites—with a carbon matrix or ceramic matrix—not only because of their well-known mechanical and thermal resistance properties, but also for their intrinsic porosity which is generally rather considered to be a disadvantage (see patent U.S. Pat. No. 5,583,895).

Thanks to the excellent mechanical and thermal resistance properties of thermostructural composites, the rocket engine according to the present invention may have a very low mass with respect to known engines. Thanks to the porosity of these composites, a simple porous skin which nonetheless has good resistance to heat can be produced. Of course, the porosity of said skin may be adapted, in a known way, to any desired value when the matrix of the composite of which it is made is densified.

As a preference, said porous skin forms part of a first monolithic piece of thermostructural composite comprising two skins of composite spaced apart from one another leaving between them an intermediate space and joined together by a plurality of threadlike spacers of composite, passing across said intermediate space but not in any way impeding the free circulation of a fluid in said intermediate space.

Thus, if in the rocket engine of the present invention, said divergent nozzle is arranged in the continuation of said combustion chamber, on the opposite side of said throat to said combustion chamber:

said first monolithic piece maybe cylindrical and arranged coaxially with respect to the longitudinal axis of said engine so that one of said skins is an inner skin whereas the other is an outer skin;

said oxidizer maybe introduced into the cylindrical volume delimited by said inner skin on the opposite side to said nozzle, this volume forming the heart of said combustion chamber; and said fuel maybe introduced into said intermediate space, which therefore has an annular cross section, also on the opposite side to said nozzle, so that said inner skin acts as a porous skin for the introduction of at least some of said fuel into the heart of said combustion chamber.

Said outer skin of said first monolithic piece may be completely sealed against liquids and against gases, for example by applying an appropriate coating.

It is advantageous for said first monolithic piece to have an inside diameter greater than that of said throat and for the annular orifice of said intermediate space, arranged on the same side as said nozzle, to lie facing the convergent part of said throat.

Thus, it is possible easily to use a small proportion of the fuel, introduced into said intermediate space of annular cross section but not passing through said inner skin toward the heart, to cool the region of the throat.

Said nozzle may comprise, beyond said throat, a sheath able to house said first monolithic piece.

Thus, the entity consisting of the nozzle, the throat and the sheath therefore forms a second monolithic piece, into which said first monolithic piece is inserted. This second monolithic piece may, for example, be made of metal. However, for the reasons mentioned hereinabove, it is advantageous for it, just like said first piece, also to be made of thermostructural composite. In this case, said second monolithic piece may advantageously constitute a continuation of said outer skin of said first monolithic piece, this continuation forming an integral part of said outer skin. The result of this then is that said first and second monolithic pieces form just one piece.

In an alternative form of embodiment of the rocket engine according to the present invention, said combustion chamber is arranged in said divergent nozzle near the vertex thereof.

In this case it is advantageous for:

said combustion chamber to comprise:
- an inner first monolithic piece of composite, of cylindrical shape, arranged coaxially with respect to the axis of the engine and having an inner skin and an outer skin separated by an intermediate space, of annular cross section; and
- an outer first monolithic piece of composite, of cylindrical shape, arranged coaxially with respect to said axis and having an inner skin and an outer skin separated by an intermediate space, of annular cross section, said outer first piece surrounding said inner first piece, so as to form between them an annular heart of combustion;

said inner and outer first pieces to form between them and the vertex of said divergent nozzle an annular passage for communication with said nozzle;

said oxidizer is introduced into said annular heart of combustion from the opposite side to said vertex of the nozzle; and said fuel is introduced into said intermediate spaces, of annular cross section, of said inner and outer first pieces also from the opposite side to said vertex.

Thus, in this embodiment, the fuel is introduced into said annular combustion heart through the outer skin of said inner first piece and through the inner skin of said outer first piece. The combustion gases then pass from said annular combustion chamber to the divergent nozzle through said annular communication passage that forms a throat. The fuel passing through the outer skin of the outer first piece is able to cool the divergent nozzle near said annular communication passage. If need be, the inner skin of the inner first piece is sealed against liquids and against gases.

Advantageously, the vertex of said divergent nozzle is pierced with an orifice and the collection of said inner and outer first pieces is secured to said nozzle by a third monolithic piece of composite in the shape of a horn.

As a preference, said combustion chamber is supplied with fuel via a dome-shaped piece arranged on the opposite side of said combustion chamber to the vertex of the nozzle and the convex wall of which faces toward said nozzle and is made of thermostructural composite.

BRIEF DESCRIPTION OF THE DRAWINGS

The figures of the attached drawing will make it easy to understand how the invention may be embodied. In these figures, identical references denote similar elements.

FIGS. 3A to 3D schematically illustrate, on a larger scale, the steps in the method for moving on from the state of FIG. 2E to the state of FIG. 2F, FIG. 3A corresponding to the section line IIIA—IIIA of FIG. 2E and FIG. 3D to the section line IIID—IIID of FIG. 2F. In these FIGS. 3A to 3D, the two portions of each stitch are depicted very far apart, for the purpose of clarity.

FIG. 5 depicts, schematically and in axial section, a second exemplary embodiment of the rocket engine according to the present invention.

DETAILED DESCRIPTION OF THE INVENTION

Figure 1:
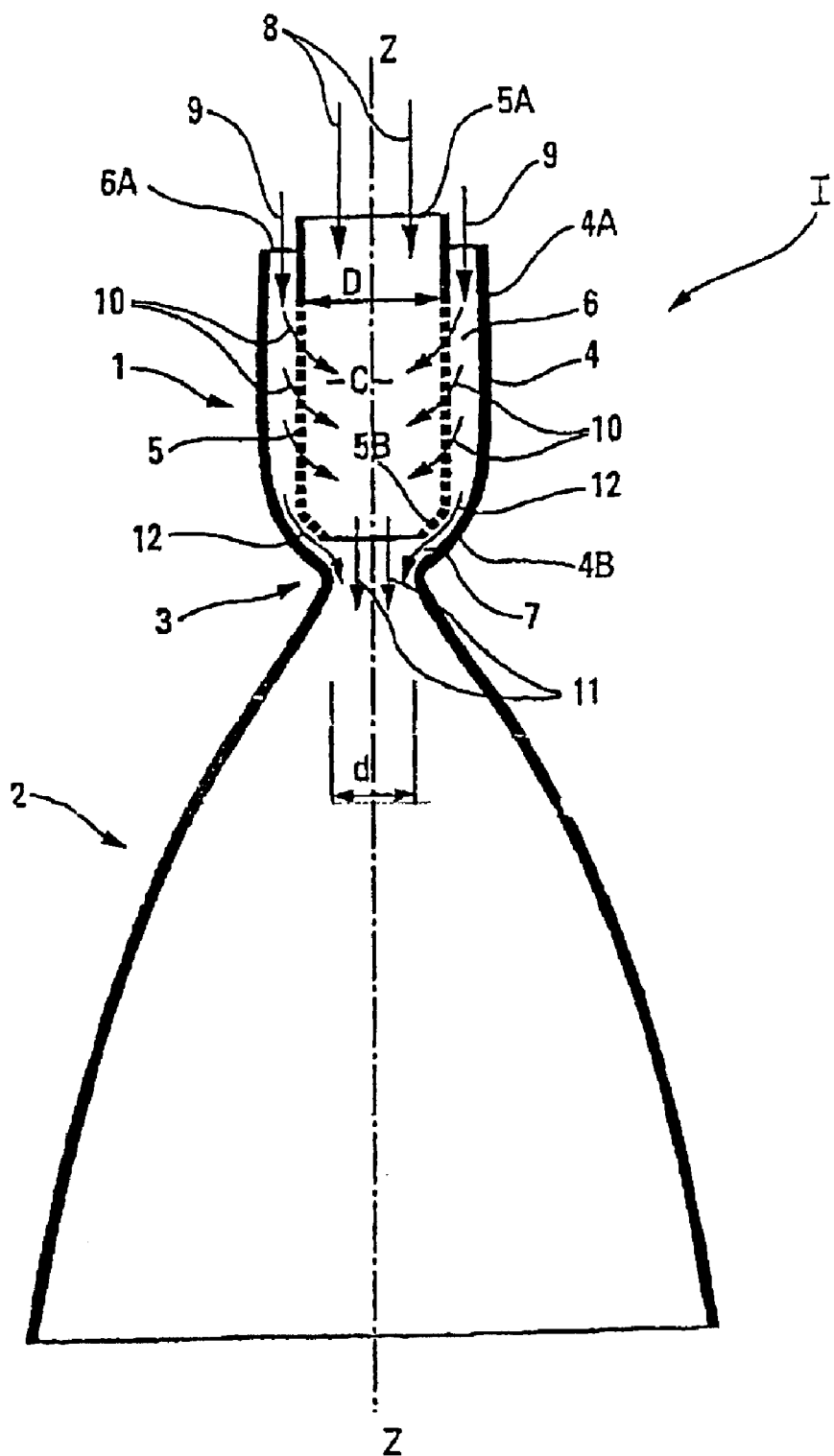
FIG. 1 depicts, schematically and in axial section, a first exemplary embodiment of the rocket engine according to the present invention.

The exemplary embodiment of the rocket engine I, according to the present invention and depicted schematically in FIG. 1, comprises a combustion chamber 1 and a divergent nozzle 2 connected to one another by a throat 3. The longitudinal axis of the engine I bears the reference Z—Z.

The combustion chamber 1 comprises an outer wall 4, of which the part 4A, opposite the nozzle 2, is roughly cylindrical, whereas the part 4B of the outer wall 4, arranged at the same end as said nozzle 2, is convergent to connect with the throat 3. Thus, the outer wall 4, the throat 3 and the nozzle 2 are in continuity and able to constitute a single piece.

The combustion chamber 1 additionally comprises a porous inner wall 5, the axis of which is coincident with the axis Z—Z and which is arranged inside the outer wall 4, forming with the latter a cylindrical intermediate space of annular cross section 6. The porous inner wall 5 is also roughly cylindrical, and its diameter D is greater than the diameter d of the throat 3. Facing the convergent part 4B of the outer wall 4, the inner wall 5 has a convergent part 5B which, with said convergent part 4B, determines an annular passage 7 forming a restriction for the annular space 6.

In the example depicted, said combustion chamber 1 consists, at least in part, of a first monolithic piece of thermostructural composite, in which said porous inner wall 5 consists of a skin made of composite. Likewise, said divergent nozzle 2 may constitute or form part of a second monolithic piece of thermostructural composite. Said first and second monolithic pieces, which may each comprise part of the throat 3 or alternatively just one of which comprises said throat 3, are secured together or made as a single monolithic piece, to form the rocket engine I.

In the combustion chamber 1, combustion takes place inside the cylindrical volume C delimited by the porous inner wall 5 and forming the heart of said combustion chamber. A stream of oxidizer, essentially oxygen, is introduced into the heart C through the end 5A of said inner wall 5 which is the opposite end to the nozzle 2, as illustrated by the arrows 8. A stream of fuel, essentially hydrogen, is introduced into the annular intermediate space 6 through the opposite end 6A thereof to the nozzle 2, as is illustrated by the arrows 9. Thanks to the appropriate porosity of the inner composite wall 5 and to the restriction formed by the passage 7, most of the fuel introduced into the annular space 6 passes through said inner composite wall 5 and enters the inside of the heart C—as indicated by the arrows 10—where it is burnt, thanks to the addition of the oxidizer (arrows 8).

The gases resulting from the combustion escape from said heart C through the end 5B of the wall 5, the opposite end to the end 5A, and pass into the nozzle 2, passing through the throat 3, as illustrated by the arrows 11.

Furthermore, a small portion of the fuel introduced into the annular intermediate space 6 (arrows 9) passes through the annular passage 7, as illustrated by the arrows 12, cooling the part 5B of the inner wall 5, the part 4B of the outer wall 4 and the throat 3. At this throat, fuel passing through the convergent annular passage 7 mixes with the combustion gases (arrows 11).

FIGS. 2A to 2F, 3A to 3D and 4 schematically illustrate one embodiment, in the form of composite, of the engine I of FIG. 1.

To produce it, the starting point is to produce, for example out of a synthetic foam material through which a needle can pass, a former 20 (see FIG. 2A) exhibiting the interior shape of the inner porous wall 5, including the convergent part 5B. Then, any known method (winding, weaving, etc.) is used to apply to this former 20 a structure 21 of high-strength fibers such as fibers based on carbon or on silicon carbide, which structure is intended to form a fibrous framework for said inner wall 5 (see FIG. 2B). Next, an annular core 22, for example made of a polystyrene foam not impregnable by the resins intended to form the composite matrices and representative of the annular intermediate space 6, including the passage 7, is applied to the fibrous structure 21 (see FIG. 2C). The material of the core 22 can be pierced by a needle and removed thermally.

Figure 2C:
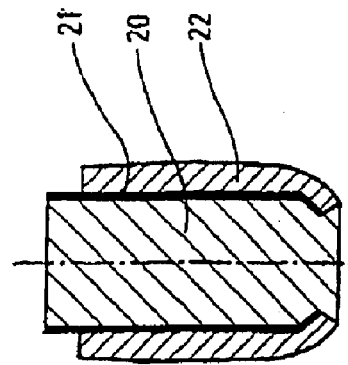
FIGS. 2A to 2F schematically illustrate one embodiment of the combustion chamber of the engine of FIG. 1.
Figure 2F:
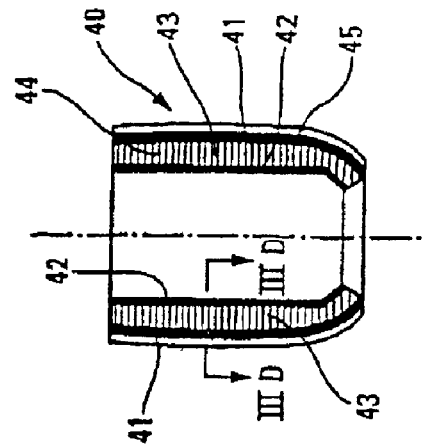
Figure 2B:
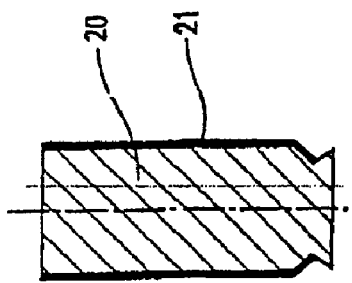
Figure 2E:
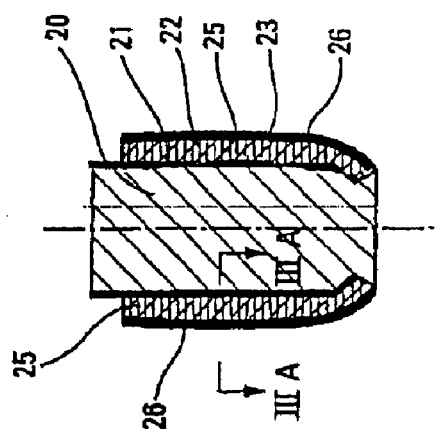
Figure 2A:
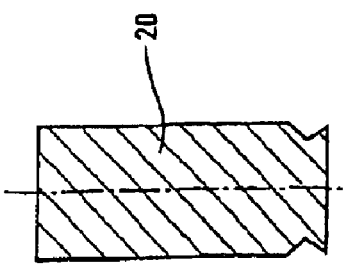
Figure 2D:
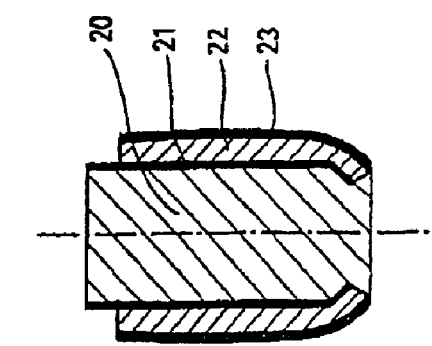
Figure 4:
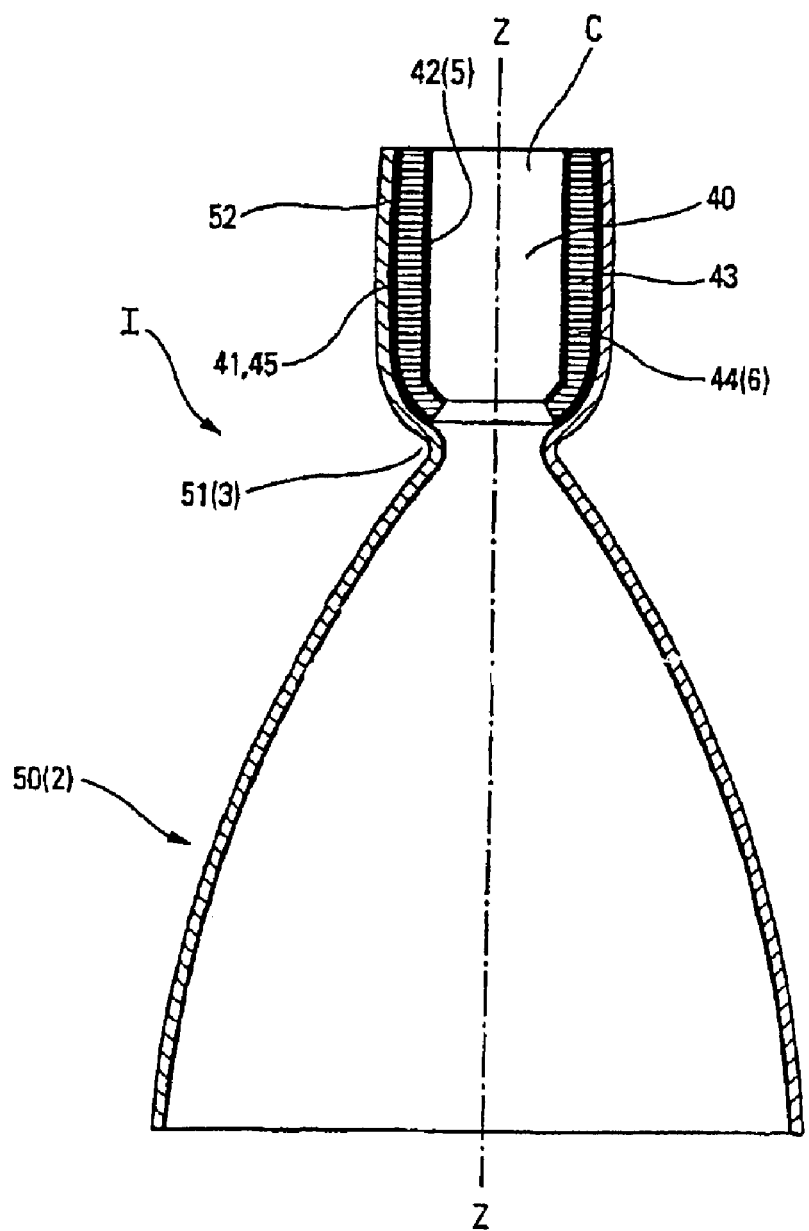
FIG. 4 schematically illustrates one embodiment of the engine of FIG. 1, comprising the combustion chamber of FIG. 2F.

A structure 23 of high-strength fibers (C, SiC, etc.) is applied to the annular core 22, this structure being intended to constitute a fibrous framework for at least part of said outer wall 4 (see FIG. 2D).

As shown in FIG. 2E and, on a larger scale, in FIG. 3A, the fibrous structure 21, the annular core 22 and the fibrous structure 23 are joined together by stitching without knotting of a continuous filament 24, itself consisting of a plurality of high-strength fibers (C, SiC, etc.). The continuous filament 24 forms portions 25, 26 passing through the elements 21, 22, 23 and connected alternately to one another by bridges 27 applied to the fibrous structure 23 and by loops 28 penetrating the former 20.

After this stitching operation, the former 20 is removed and the loops 28 are knocked over and pressed against the fibrous structure 21 to form masses 29 (see FIG. 3B), then the collection of fibrous structures 21 and 23 is impregnated with a curable resin that is relatively low in viscosity and possibly diluted, for example with alcohol. Impregnation is preferably performed under vacuum, so that said resin not only penetrates the fibrous structures 21 and 23 but also runs along and into the portions of penetrating filament 25, 26. During this impregnation, the core 22 is not impregnated with resin because it is impermeable thereto.

The impregnated resin is then cured, for example by raising its temperature, for long enough for the fibrous structures 21 and 23 to become rigid skins 30 and 31 respectively, and for the portions of penetrating filament 25 and 26 to become rigid threadlike spacers 32. (see FIG. 3C). These spacers 32 are firmly anchored at their ends in the rigid skins 30 and 31 by rigid anchors 33 and 34 formed, respectively, from the masses 29 and the bridges 27.

To form the matrix of all the rigid skins 30 and 31 and spacers 32, said assembly is subjected to pyrolysis at high temperature, for example of the order of 900° C., something which stabilizes the geometry of said assembly and eliminates the core 22. This assembly may possibly be densified and treated in a known way so that its matrix turns into one of the ceramic type. This then yields the monolithic piece 40 (see FIGS. 2F and 3D) intended at least in part to form the combustion chamber 1 and comprising:

an outer skin 41 of composite, originating from the skin 31 and intended at least in part to form the outer wall 4, 4A, 4B of the combustion chamber 1;

an inner skin 42 of composite, originating from the skin 30 and intended to form the inner wall 5, 5A, 5B of the combustion chamber 1; and a plurality of threadlike spacers 43 of composite, originating from the spacers 32.

In this monolithic piece 40, the skins 41 and 42 are spaced apart, delimiting an annular space 44 crossed by the spacers 43 without being plugged and intended to form the annular space 6 of the combustion chamber 1.

It is known that, through its nature, a composite is porous and that this porosity depends on the conditions under which the matrix is formed. It can therefore be readily appreciated that the porosity of the inner skin 42 can be tailored to impart thereto the required porosity for the inner wall 5, 5A, 5B. In so doing, the outer skin 41 is given a porosity identical to that desired for the inner skin 42. Now, since the outer wall 4 needs to be impervious, it may be advantageous for the outer skin 41 to be externally coated with a sealing coating 45, as is depicted in FIG. 2F.

A second monolithic composite piece 50 intended to form at least said nozzle 2 is produced. Such a second composite piece 50 is easy to produce by winding or weaving strong fibers (C, Si, etc.) onto an appropriate former, then by impregnating with resin and pyrolyzing the matrix thus formed. Next, to obtain the engine I, the composite monolithic piece 40 is assembled with the composite monolithic piece 50. This can be done in any known way, for example mechanically or by bonding. In addition, in a preferred embodiment illustrated schematically in FIG. 4, there is provided on the monolithic composite piece 50 not only a part 51 able to form the throat 3 but also a part 52 able to act as a housing for said composite monolithic piece 40. In this case, the outer wall 4 of the engine I is then formed by the superposition and assembly of the skin 41, possibly of the coating 45, and of the part 52.

As an alternative, it will be readily appreciated from that which has been described that the second composite piece 50 may be the continuation of the outer skin 41 and form a monolithic piece therewith, as illustrated schematically in FIG. 1.

In the alternative form of embodiment II of the rocket engine, according to the present invention and depicted in FIG. 5, the combustion chamber 60 is arranged inside the divergent nozzle 61, near the vertex 62 thereof. This divergent nozzle 61 consists, for example, of a composite monolithic piece obtained in a similar way to the nozzle 2 as described hereinabove. In addition, provision is made for the vertex 62 of the divergent nozzle 61 to be pierced with an orifice 63.

The combustion chamber 60 comprises:

an inner composite monolithic piece 64, of cylindrical shape, arranged coaxially with respect to the axis Z—Z of the engine and having an inner composite skin 65 and an outer composite skin 66. This composite piece 64 may be obtained in the way described hereinabove with respect to the composite piece 40; and an outer composite monolithic piece 67, of cylindrical shape, arranged coaxially with respect to the axis Z—Z and having an inner composite skin 68 and an outer composite skin 69. The composite piece 67 may also be obtained in a similar way to the piece 40.

The outer composite piece 67 surrounds the inner composite piece 64 delimiting between them an annular heart C for said combustion chamber 60.

The composite pieces 64 and 67 are secured, on the same side as the nozzle 61, to a manifold 70 able to supply them with gaseous fuel and, on the opposite side, to a third composite monolithic piece 71, in the form of a horn, connecting them to the divergent nozzle 61 along the edge of the orifice 63. The combustion chamber 60 forms, between itself and the vertex of the nozzle 61, an annular passage 72 forming a throat and providing communication with said nozzle.

Just like the wall 41 of the piece 40, the inner skin 65 of the inner piece 64 is advantageously sealed against gas.

Through the piece 71, the gaseous oxidizer is introduced into the annular heart C, from the opposite side to the vertex 62, by injectors 73. Through the piece 71 and the manifold 70, the fuel is introduced, from the opposite side to the vertex 62, into the annular intermediate spaces 74 and 75 (analogous to the intermediate space 44 of the piece 40) of the composite pieces 64 and 67. Through the outer skin 66 of the piece 64 and through the inner skin 68 of the piece 67, said fuel passes into the annular heart C, where it burns with the oxidizer. The combustion gases escape from the combustion chamber 60 from the same side as the vertex 62 and pass into the nozzle 61 through the throat 72. The fuel gas escaping through the outer skin 69 cools the nozzle 61 near the combustion chamber 60. The paths of the gases are indicated by arrows in FIG. 5.

In the embodiment depicted in FIG. 5, the fuel supply device comprises a hollow dome 76 supplied with fuel by a duct 77 passing through said piece 71 and itself supplying the manifold 70. The convex side of the dome 76 faces the same direction as the nozzle 61, away from the combustion chamber 60. As a preference, at least the convex wall 78 of said dome 76 is made of thermostructural—and therefore porous—composite, so that this dome is cooled by seepage of said fuel through said convex wall 78.

What is claimed is:

1. A rocket engine comprising a combustion chamber in the heart of which a fuel and an oxidizer are burnt and which is connected, by a throat, to a divergent nozzle through which the gases resulting from said combustion escape, said heart being supplied with oxidizer via its opposite end to said throat and being surrounded by a porous skin of thermostructural composite which receives fuel on its opposite outer side to said heart, some of this fuel being introduced into said heart through said porous skin, wherein said proportion of the fuel introduced into said heart through said porous skin constitutes the fuel supply to said engine and in that the proportion of said fuel not passing through said porous skin is directed toward said throat to cool it.

2. The rocket engine as claimed in claim 1, wherein said porous skin forms part of a first monolithic piece of thermostructural composite comprising two skins of composite spaced apart from one another leaving between them an intermediate space and joined together by a plurality of threadlike spacers of composite.

3. The rocket engine as claimed in claim 2, which is provided with a longitudinal axis and in which said divergent nozzle is arranged in the continuation of said combustion chamber, on the opposite side of said throat to said combustion chamber, wherein:

said first monolithic piece is cylindrical and arranged coaxially with respect to said longitudinal axis so that one of said skins is an inner skin whereas the other is an outer skin;

said oxidizer is introduced into the cylindrical volume delimited by said inner skin and forming the heart of said combustion chamber, on the opposite side to said nozzle; and said fuel is introduced into said intermediate space, which therefore has an annular cross section, also on the opposite side to said nozzle.

4. The rocket engine as claimed in claim 3, wherein said outer skin of said first monolithic piece is sealed against liquids and against gases.

5. The rocket engine as claimed in claim 3, wherein said first monolithic piece has an inside diameter greater than that of said throat and in that the annular orifice of said intermediate space, arranged on the same side as said nozzle, lies facing the convergent part of said throat.

6. The rocket engine as claimed in claim 2, wherein said nozzle comprises, beyond said throat, a sheath able to house said first monolithic piece.

7. The rocket engine as claimed in claim 2, wherein said nozzle consists of a second monolithic piece of composite.

8. The rocket engine as claimed in claim 2, wherein said nozzle consists of a second monolithic piece of composite and in that said second monolithic piece constitutes a continuation of said outer skin of said first monolithic piece, this continuation forming an integral part of said outer skin.

9. The rocket engine as claimed in claim 2, which is provided with a longitudinal axis and in which said combustion chamber is arranged in said divergent nozzle near the vertex thereof, wherein:

said combustion chamber comprises:

an inner first monolithic piece of composite, of cylindrical shape, arranged coaxially with respect to said axis and having an inner composite skin and an outer composite skin; and an outer first monolithic piece of composite, of cylindrical shape, arranged coaxially with respect to said axis and having an inner composite skin and an outer composite skin, said outer first piece surrounding said inner first piece, so as to form between them an annular heart for said combustion chamber;

said inner and outer first pieces forming between them and the vertex of said divergent nozzle an annular passage for communication with said nozzle;

said oxidizer is introduced into the annular heart of said combustion chamber from the opposite side to said vertex of the nozzle; and said fuel is introduced into the intermediate spaces, of annular cross section, of said inner and outer first pieces from the opposite side to said vertex of the nozzle.

10. The rocket engine as claimed in claim 9, wherein the inner skin of the inner first piece is sealed against liquids and against gases.

11. The rocket engine as claimed in claim 9, wherein the vertex of said divergent nozzle is pierced with an orifice and in that the collection of said inner and outer first pieces is secured to said nozzle by a third monolithic piece of composite in the shape of a horn.

12. The rocket engine as claimed in claim 9, wherein said combustion chamber is supplied with fuel via a dome-shaped piece arranged on the opposite side of said combustion chamber to the vertex of the nozzle and the convex wall of which faces toward the nozzle and is made of thermostructural composite.

* * * * *